May 14, 1929.  C. F. WASSERFALLEN  1,713,311
TIRE CARRIER
Filed July 19, 1922
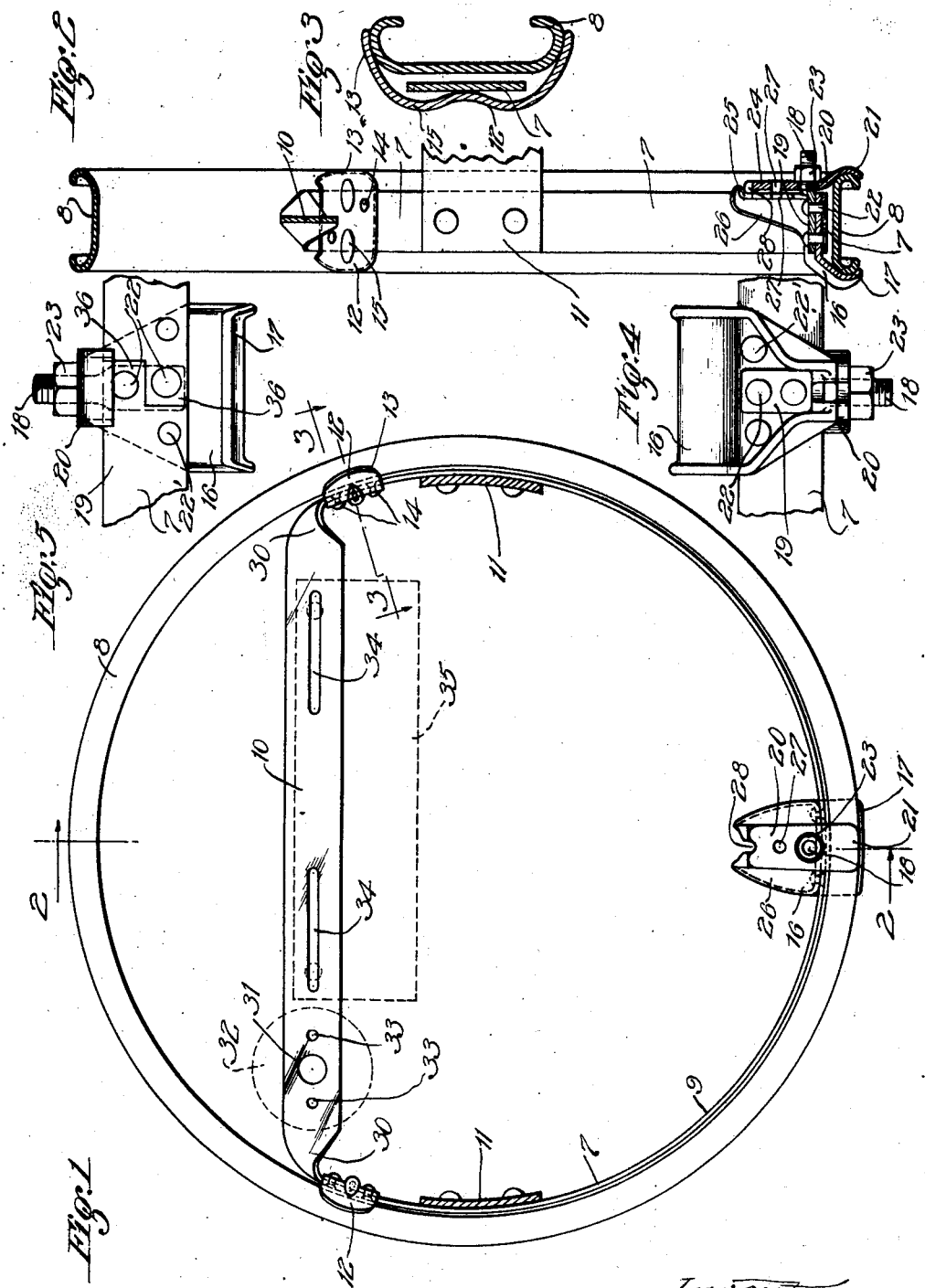

Patented May 14, 1929.

1,713,311

UNITED STATES PATENT OFFICE.

CHARLES F. WASSERFALLEN, OF DETROIT, MICHIGAN, ASSIGNOR, BY MESNE ASSIGNMENTS, TO KELVINATOR CORPORATION, OF DETROIT, MICHIGAN, A CORPORATION OF MICHIGAN.

TIRE CARRIER.

Application filed July 19, 1922. Serial No. 575,923.

The invention relates to spare tire carriers for automobiles. Its primary object is to provide a carrier which can be produced at a low cost for use on the cheaper grades of automobiles, which is efficient in operation and which may be conveniently manipulated to secure a tire carrying rim thereon and to release it therefrom.

The invention consists in the several novel features hereinafter set forth and more particularly defined by the claims at the conclusion hereof.

In the drawing: Fig. 1 is an elevation of a carrier embodying the invention, a demountable rim being shown secured thereon. Fig. 2 is a section taken on line 2—2 of Fig. 1. Fig. 3 is a section taken on line 3—3 of Fig. 1. Fig. 4 is a plan of the adjustable rim-locking device on the lower portion of the carrier band. Fig. 5 is a detail inverted plan of the joint between the ends of the strip forming the supporting band.

The invention is exemplified in a structure which comprises a band 7 which is adapted to lie within the inner periphery of a demountable rim 8 of any suitable or well-known construction. This band is formed of a single piece of substantially flat metal and comprises a circular or circumferential portion 9 extending near the inner periphery of the rim and a chordal member or bar 10. The circumferential portion of the band extends through a sufficient portion, in excess of 180° of the circle, so that the rim-holding devices thereon will radially support the rim in all directions by engagement with the rim at three points. This band is secured in fixed relation to the chassis of a vehicle by brackets 11, as well understood in the art.

The devices for securing the demountable rim on the band comprise a pair of upper plates 12 which are preferably formed of metal and have their outwardly extending ends 13 to form seats for the demountable rim whereby it will be secured radially and axially. These plates 12 are permanently secured to the band by rivets 14 and are disposed adjacent the upper ends of the circular portion of the band and adjacent the ends of the bar 10. To stiffen these plates, which are formed of sheet metal, they are indented, as at 15.

The lower rim-securing device comprises a fixed member or bracket 16 having a base-portion fitting against the inner periphery of the band 7 and a downwardly extending terminal 17 which forms a retaining seat for one side of the rim, a bolt 18 which has a flanged shank 19 fitting against the top of the base of bracket 16, and a removable lug 20 which has its lower end 21 extending to engage the other side of the rim and coact with the terminal 17 of bracket 16 to grip the lower portion of the demountable rim. Rivets 22 extending through the shank 19, the base of bracket 16 and the band 7 rigidly secure these elements together. The band is additionally secured to brackets 16 by rivets 22' at the sides of shank 19. A nut 23 on the bolt 18 is adapted to lock the lug 20 in position to secure the rim seated in the bracket 16. The upper end of lug 20 is extended to bear against a seat 25 formed in an upward extension 26 on bracket 16. A hole 27 extending through lug 20, bracket 16, and a notch 28 in the upper ends of lug 20 and bracket-portion 24 is adapted to receive the hasp of a padlock to lock the lug against unauthorized removal. When the demountable rim is seated in plates 12 with its lower portion secured by brackets 16 and lug 20, it will be locked in place against squeaks and rattles.

In practice, it is desirable to avoid excessive weight in the make up of the carrier, and the chordal bar 10 serves as a strut between the upper ends of the circular portion of the band and between the plates 12. In order to make it possible to form this chordal bar integral with the strip used to form the band and to give it sufficient radial rigidity to perform its function, the strip of metal forming the band and the bar is twisted, as at 30, where the bar joins the ends of the circular portion of the band, so that the plane of the face of the chordal bar will be vertical while the faces of the circular portions of the band will be axial. This cross-bar 10 is provided with an opening 31 for the stem of a tail-light 32 and holes 33 for securing the tail-light to the bar and also with slots 34 for the reception of bolts to secure a license plate 35 on the bar.

The joint between the ends of the strip which forms the band is made by notching the ends to form portions 36 which fit together side-by-side and underlie the base of bracket 16, so that the ends of the band will be effectively secured together through bracket 16 and rivets 22 and 22'. In this manner, the bracket 16 is utilized to form a secure joint for the ends of the strip forming the band.

The invention exemplifies a tire carrier in which a band adapted to lie within the inner periphery of a demountable rim is formed of a single continuous substantially flat strip of metal and comprises a chordal and circular portion; which is simple in construction; which is efficient in operation; which is especially adapted for securing the smaller sizes of rims; and which can be produced at a low cost.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a spare tire carrier, the combination of a band formed of a single strip of metal and comprising a circumferential portion adapted to extend into and lie within the inner periphery of a spare rim, means to support the band, means for removably securing a rim on said band comprising a bracket supported by the band, both ends of the band lapping the bracket, and means to secure both ends to said bracket.

2. In a spare tire carrier, the combination of a band formed of a single strip of metal and comprising a circumferential portion adapted to extend into and lie within the inner periphery of the spare rim, means to support the band, a bracket, the ends of the strip of metal being notched and interfitting and lapping the bracket, and means securing said ends to said bracket.

3. In a spare tire carrier, the combination of a band formed of a substantially flat strip of metal and comprising a circumferential portion adapted to extend into and lie within the inner periphery of the spare rim, and a chordal bar integral therewith and twisted connections between the bar and the circumferential portion, means to support the band, means for removably securing a rim on said band comprising a bracket, the strip of metal having its ends notched and interfitting and lapping the bracket and means to secure said ends to said bracket.

Signed at Detroit, Michigan, this 26th day of June, 1922.

CHARLES F. WASSERFALLEN.